US006733578B2

(12) United States Patent
Liu et al.

(10) Patent No.: US 6,733,578 B2
(45) Date of Patent: May 11, 2004

(54) PLASTICIZED PROLAMINE COMPOSITIONS

(75) Inventors: Jingping Liu, Highland Park, NJ (US); Willy Weisheng Lee, Bridgewater, NJ (US)

(73) Assignee: Wm. Wrigley Jr. Company, Chicago, IL (US)

( * ) Notice: Subject to any disclaimer, the term of this patent is extended or adjusted under 35 U.S.C. 154(b) by 39 days.

(21) Appl. No.: 10/177,831

(22) Filed: Jun. 20, 2002

(65) Prior Publication Data

US 2003/0235639 A1 Dec. 25, 2003

(51) Int. Cl.[7] ............... A23G 3/30; A23J 3/14; C08L 89/00
(52) U.S. Cl. ............... 106/161.1; 426/3; 426/5; 426/6; 426/660; 530/372; 530/373
(58) Field of Search ............... 106/161.1; 426/3, 426/5, 6, 660; 530/372, 373

(56) References Cited

U.S. PATENT DOCUMENTS

| 2,154,482 A | 4/1939 | Weber |
| 2,489,147 A | 11/1949 | Lougovoy |
| 3,116,206 A | 12/1963 | Brynko et al. |
| 4,433,076 A | 2/1984 | Bauer et al. |
| 4,474,749 A | 10/1984 | Kruppa |
| 4,753,790 A | 6/1988 | Silva et al. |
| 4,863,745 A | 9/1989 | Zibell |
| 4,931,295 A | 6/1990 | Courtright et al. |
| 5,112,625 A | 5/1992 | Zibell et al. |
| 5,139,794 A | 8/1992 | Patel et al. |
| 5,324,351 A | 6/1994 | Oshlack et al. |
| 5,342,923 A | 8/1994 | Takahashi et al. |
| 5,367,055 A | 11/1994 | Takahashi et al. |
| 5,409,715 A | 4/1995 | Meyers |
| 5,433,960 A | 7/1995 | Meyers |
| 5,482,722 A | 1/1996 | Cook |
| 5,589,468 A | 12/1996 | Lin et al. |
| 5,882,702 A | 3/1999 | Abdel-Malik et al. |
| 6,020,008 A | 2/2000 | Li |

FOREIGN PATENT DOCUMENTS

| DE | 30 43 914 A1 | 6/1981 |
| JP | 7-163300 | 6/1995 |
| WO | WO 89/09594 | 12/1989 |
| WO | WO 90/06061 | 6/1990 |
| WO | WO 90/12512 | 11/1990 |

Primary Examiner—Arthur L. Corbin
(74) Attorney, Agent, or Firm—Bell, Boyd & Lloyd LLC

(57) ABSTRACT

Plasticized prolamine compositions and methods of preparing same are provided. The compositions can be used for making chewing gum bases, especially as biodegradable chewing gum bases. The inventive plasticizers are selected from a group of N-acyl derivatives of amino acids. The compositions are also useful for making other edible products as well as eco-friendly packaging films, coatings, adhesives, and encapsulation vehicles for medicament delivery and the like.

14 Claims, 1 Drawing Sheet

PLASTICIZED PROLAMINE COMPOSITIONS

BACKGROUND OF THE INVENTION

The present invention relates to plasticized prolamine mixtures. More specifically, the present invention relates to edible and biodegradable prolamine compositions.

Prolamine is a type of protein. Zein is a water-insoluble prolamine obtained from corn. Zein is edible and readily biodegradable, therefore zein is an attractive material for use in food applications. Additionally, zein has been used in industrial applications. In this regard, zein has been used in creating packaging films, coatings, and adhesives.

However, the glass transition temperature of zein is in the range of 136–140° C., making zein a very brittle plastic material at ambient temperatures. Moreover, zein is usually used in the form of either a fine powder or an alcohol/water solution. This creates processing difficulties that limit the applications of zein.

Because zein is edible and biodegradable, there have been attempts at using zein in products such as chewing gum formulations. Further, when used as a component of chewing gum, the fact that zein becomes brittle after it loses moisture is an advantageous property. This feature eases the removal of zein-containing gum cuds from substrates.

A number of patents discuss the use of zein in chewing gum. See, U.S. Pat. Nos. 2,154,482; 2,489,147; 5,482,722; 5,139,794; 3,116,206; 5,112,625; 4,863,745; 4,931,295; 5,367,055; 5,482,722; 4,753,790; 4,474,749; 5,409,715; 5,433,960; 5,882,702; and non-U.S. patents and published applications: JP95-163300; German Patent DE3043914A1; PCT WO90/12512; PCT WO90/06061; and PCT WO89/09594. Other patents discussing zein include U.S. Pat. Nos. 5,325,351; 5,367,055; 5,342,923; 5,324,351; and 6,020,008.

Due to the above-noted difficulties associated with current methods of processing zein, the use of zein in chewing gum, as well as other food-grade and eco-friendly products and industrial applications, has been problematic. There is therefore a need for improved prolamine compositions and methods for producing same.

SUMMARY OF THE INVENTION

The present invention provides plasticized prolamine compositions, processes for making same, and improved biodegradable and edible products such as chewing gums, package films, coatings, adhesives, and encapsulants for drugs, flavors, and sweeteners.

To this end, in an embodiment, the present invention provides for a method of plasticizing a prolamine by combining at least one prolamine and at least one N-acyl derivative of amino acid.

In an embodiment, a method is provided whereby physical properties of prolamines can be modified by combining at least one prolamine and at least one N-acyl derivative of amino acid. The physical property modified can include chemical structure, consistency, tack, texture and melting point.

In an embodiment, the present invention provides edible and biodegradable products comprising a plasticized prolamine blend of at least one prolamine and at least one N-acyl derivatives of amino acid.

In a further embodiment, the invention provides for blends comprising at least one prolamine and at least one N-acyl derivative of amino acid.

In an embodiment, the blend is thermally processable.

In an embodiment, the prolamines can include zein, corn gluten meal, wheat gluten, wheat gliadin, secalinin, avenin, hordein, panicin, orzenin, kafirin and combinations thereof.

In an embodiment, the N-acyl derivative of amino acid can include N-cocoyl sarcosine, N-oleoyl sarcosine, N-lauroyl sarcosine, N-myristoy sarcosine, N-stearoyl sarcosine, N-butyroyl sarcosine, N-caproyl sarcosine, N-capryloyl sarcosine, N-palmitoyl sarcosine, N-arachidoyl sarcosine, N-behenoyl sarcosine, N-lignoceroyl sarcosine, N-myristoleoyl sarcosine, N-palmitoleoyl sarcosine, N-erucoyl sarcosine, N-linoleoyl sarcosine, N-linolenoyl sarcosine and combinations thereof In an embodiment, N-acyl derivative of amino acid is a reaction product of a reaction between at least one amino acid and at least one fatty acid. In this regard, amino acids can include alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine and combinations thereof. Moreover, fatty acids can include butyric, caproic, caprylic, capric, lauric, myristic, palmitic, stearic, arachidic, behenic, lignoceric, myristoleic, palmitoleic, oleic, erucic, linoleic, linolenic, arachidonic, eicosapentaenoic, docosahexaenoic and combinations thereof.

In an embodiment, the prolamine comprises about 5% to about 99.5% by weight of the plasticized blend.

In an embodiment, the N-acyl derivative of amino acid comprises about 0.5% to about 95% by weight of the plasticized blend.

In an embodiment, a method of making such plasticized prolamine blends is provided whereby prolamine is combined with N-acyl derivative of amino acid.

In an embodiment, prolamine and N-acyl derivative of amino acid can be combined using a batch mixer or continuous extruder.

In an embodiment, prolamine can be combined directly with N-acyl derivative of amino acid.

In an embodiment, prolamine can first be mixed with an alcohol/water mixture prior to being combined with N-acyl derivative of amino acid.

In an embodiment, products are provided that contain the plasticized prolamine blends disclosed herein.

In a further embodiment, a method is provided whereby a product is produced by dissolving at least one prolamine in and alcohol/water mixture and adding at least one N-acyl derivative of amino acid to the mixture.

In an embodiment, chewing gum bases containing plasticized prolamines are disclosed whereby the gum bases include a plasticized blend of prolamine and N-acyl derivative of amino acid.

In an embodiment, methods for manufacturing such chewing gum bases are provided whereby prolamine is combined with N-acyl derivative of amino acid.

In an embodiment, chewing gums containing plasticized prolamines and a flavor are provided.

In a further embodiment, biodegradable products containing plasticized prolamines are disclosed. In this regard, the biodegradable products can include confections, chewing gums, adhesives, coatings, packaging films, and encapsulants for medicaments and flavors and the like.

In a further embodiment, a method is provided whereby a biodegradable product is produced by dissolving at least one prolamine in an alcohol/water mixture and adding at least one N-acyl derivative of amino acid to the mixture.

An advantage of the present invention is to provide a more usable form of prolamine such as zein and wheat gluten with properties ranging from pasty adhesives, to rubbery chewing gum bases, to tough packaging films.

Another advantage of the present invention is to provide an improved method for incorporating a prolamine, such as zein and wheat gluten, in an edible and biodegradable product.

Moreover an advantage of the present invention is to provide an improved edible product that includes zein and wheat gluten and other prolamines.

It is another advantage to provide improved chewing gum bases and chewing gums that are biodegradable and potentially digestible by mammals, and preferably humans.

Further, an advantage of the present invention is to provide an improved process for making mixtures including prolamine.

Yet another advantage of the present invention is to provide a prolamine containing mixture that can be altered over a wide range of properties, from a tacky state to a brittle state, through the addition of a N-acyl derivative of amino acids softener.

Still further, an advantage of the present invention is to provide an improved chewing gum product including a prolamine such as zein, corn gluten meal, wheat gluten, wheat gliadin, secalinin, avenin, hordein, panicin, orzenin, kafirin and their combinations.

Another advantage of the present invention is to provide an improved edible product including zein, corn gluten meal, wheat gluten, wheat gliadin, and wheat glutenin, secalinin, avenin, hordein, panicin, orzenin, kafirin and their combinations.

Additional features and advantages of the present invention are described in, and will be apparent from, the following Detailed Description of the Invention and the figures.

DETAILED DESCRIPTION OF THE INVENTION

Figure 1:
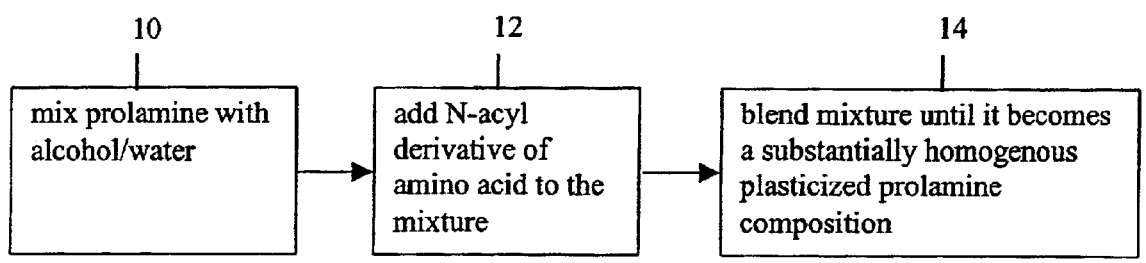
FIG. 1 illustrates a schematic view of the process steps of an embodiment of the present invention.

The present invention relates to plasticized prolamine mixtures, processes for making same, and products made therefrom.

Prolamines, which are water-insoluble and alcohol-soluble proteins found in the seeds of cereals, have been used in some consumer applications. Examples of prolamines include zein and gliadin, which are from corn and wheat, respectively. Less pure prolamines include corn gluten meal and wheat gluten. In addition to being readily edible food ingredients, because of their rapid biodegradability, these prolamines also are attractive as materials for uses such as packaging, coatings, adhesives, and encapsulations for medicaments. Plasticized prolamines of the present invention can be used for these and other consumer and industrial applications, including use in manufacturing edible products.

As used herein, the term "edible product" is intended to broadly refer to any product that is suitable for consumption by a mammal, preferably human. An edible product can include, but is not limited to, foodstuffs, confections, chewing gums, capsules for medicament delivery, and component parts thereof.

Pure forms of prolamines typically are not suitable as foodstuffs or for industrial uses without first being processed. For example, pure zein and gliadin are very brittle plastic materials at ambient temperatures. Whether a material is hard or rubbery at ambient temperatures is characterized by its glass transition temperature (Tg). For a non-crystalline material, if its Tg is lower than the ambient temperature, it should be rubbery. Both zein and gliadin have a relatively high Tg, thus they are hard and brittle at ambient temperatures.

While zein has polar amino acid groups in its main chain, its side chains are composed of more than 50% nonpolar amino acid residues such as leucine, isoleucine, valine, alanine, phenylalanine and glycine. This kind of structure makes zein insoluble in water at neutral pH but highly swellable. Its amphiphilic nature makes zein incompatible with most common plasticizers. Currently, few effective plasticizers of zein are known.

A plasticizer varies the firmness of a substance by interposing itself between the macromolecular chains of that substance. This is best accomplished when the attractive forces between the molecules of both components are similar. If the attractive forces are sufficiently dissimilar, immiscibility will result. Attraction forces between molecules typically include dispersion force, polar forces, hydrogen bonding forces and ionic forces. It is well known that ionic forces and hydrogen-bonding typically play important roles in protein dissolution in aqueous solution. In non-aqueous media, the hydrogen-bonding tends to become the major driving force to form blends between zein and plasticizers. Plasticizers are required to possess sufficient electron donors and electron acceptors in their molecular structures in order to form effective hydrogen bonding with zein macromolecules. In this regard, due to the amphiphilic nature of zein, the most effective plasticizers for zein are those that possess a balance of hydrophobic and hydrophilic portions in their molecular structures similar to zein.

N-acyl derivatives of amino acids produced from fatty acids and amino acids contain both electron donors (e.g., oxygen, nitrogen and C=C bond) and electron acceptors (e.g., hydrogen or proton in —COOH and >NH) in their molecules. They are amphiphilic due to the coexistence of hydrocarbon chains and the polar carbonyl and amide groups.

The inventors herein have surprisingly found that prolamines, such as zein, can be effectively plasticized by N-acyl derivatives of amino acid such as N-cocyl sarcosine, N-lauroyl sarcosine and N-oleoyl sarcosine. These blends are thermally processable. They can be very soft, even fluxible, before decomposition. In contrast, when sufficiently heated, pure zein and pure gliadin will thermally decompose rather than melt. This thermal processability of the plasticized blends allows the blends to be easily incorporated into edible and biodegradable products such as chewing gum.

Further, it has been found that the mechanical properties of the plasticized prolamine blends can be manipulated greatly. This range extends from a tacky state to a brittle state. The manipulation can be achieved through a change of either the content or the structure of N-acyl derivatives of amino acids, or both.

Prolamines that can be plasticized pursuant to the present invention include, but are not limited to, zein, corn gluten meal, wheat gluten, wheat gliadin, rye secalinin, oat avenin, barley hordein, milliet panicin, rice orzenin and sorghum kafirin.

N-acyl derivatives of amino acids can be produced from edible amino acids and fatty acids, which are natural food ingredients. Thus, the blends of prolamine and N-acyl derivatives of amino acids remain biodegradable and potentially edible. For example, sarcosine, methyl aminoacetic acid and N-methylglycine occur naturally in a wide range of marine organisms such as lobsters, starfish and sea urchin. By using the Shotten-Baumann procedure, sarcosine can react with one edible fatty acid, such as lauric acid, oleic acid or coconut acid, to form N-acyl sarcosines, which are biodegradable and have favorable regulatory profiles. It is preferred that the N-acyl derivatives of amino acid is liquid at body temperature.

Pursuant to the present invention, a variety of N-acyl derivatives of amino acids can be used. N-cocoyl sarcosine, N-oleoyl sarcosine, N-lauroyl sarcosine and N-myristoyl sarcosine are preferred. Such N-acyl derivatives of amino acid sarcosines also include N-stearoyl, N-butyroyl, N-caproyl, N-capryloyl, N-pahnitoyl, Narachidoyl, N-behenoyl, N-lignoceroyl, N-myristoleoyl, N-palmitoleoyl, N-erucoyl, N-linoleoyl, N-linolenoyl sarcosines and their combinations.

The N-acyl derivatives of amino acids also can include reaction products from reactions of amino acids with fatty acids. The amino acids can include alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine and valine. The fatty acids can include butyric, caproic, caprylic, capric, lauric, myristic, palmitic, stearic, arachidic, behenic, lignoceric, myristoleic, palmitoleic, oleic, erucic, linoleic, linolenic, arachidonic, eicosapentaenoic and docosahexaenoic acids.

In an embodiment, the prolamine can comprise about 5 to about 99.5% of the blend. Preferably, prolamine comprises about 20% to about 95% of the blend. In an embodiment, the N-acyl derivatives of amino acids can comprise about 0.5 to about 95% of the blend. Preferably, the N-acyl derivatives of amino acids can comprise about 5% to about 80% of the blend.

Pursuant to the present invention, a process of making plasticized prolamine blends is also provided. FIG. 1 illustrates a schematic view of the process steps of this embodiment. Generally, prolamine is dissolved in an alcohol/water mixture 10. A variety of alcohols can be used, including low and high molecular weight linear or branched alcohols. Such suitable alcohols include, but are not limited to, methanol, ethanol, propanol, and butanol. After dissolution of prolamine in the alcohol/water mixture, N-acyl derivative of amino acid is added to the mixture 12. The mixture is then blended 14. The mixture is eventually dried to remove the solvents, whereupon a plasticized (i.e., softened) prolamine results.

Pursuant to the present invention, an alternative process of making plasticized prolamine blends is provided. Generally, pursuant to the process, prolamine is added to a sigma-blade mixer or the like. An N-acyl derivative of amino acid is then added. Water is optionally added to serve as a co-plasticizer. When a homogeneous mixture is achieved, the blend is discharged.

These processes can be achieved using techniques known in the art whereby the ingredients can be combined and mixed. Examples of suitable mixers include, but are not limited to, sigma-blade mixers.

Additional ingredients, such as colorants, anti-oxidants, fillers, flavors and others can also be added.

The end product will be a prolamine blend that preferably has a solid form, that is, powder, pellet, films, or slates. Of course the consistency and shape of the end product will vary greatly depending on the preferences of the practitioner of the present invention. If desired the blend may be kept in solution with, for example, alcohol.

In an embodiment, the blended compositions of the present invention can be used as chewing gum bases, and as chewing gums when, for example, flavor is added. In this regard, such prolamine compositions are useful in chewing gums because of their elasticity. Moreover, because of their potential biodegradability, such compositions provide an environmentally friendly alternative to conventional chewing gums. Moreover, as the basic component of such compositions is prolamine, these gums can be potentially ingestible and digestible.

Chewing gum generally consists of a water insoluble gum base, a water soluble sweetener, and flavors. The insoluble gum base generally comprises elastomers, resins, fats and oils, softeners, and inorganic fillers. The plasticized prolamine compositions of the present invention can form ingestible elastomer substances. In order to produce an environmentally-friendly gum base, the plasticized prolamine elastomer can be further combined with other ingestible ingredients that may include polysaccharides, proteins or their hydrolysates, ingestible emulsifiers, and lipids. Polysaccharides may include native starches, modified starches, dextrins, maltodextrin, hydroxypropylmethylcellulose, dietary fibers, pectins, alginates, carrageenan, gellan gum, xanthan gum, gum arabic, guar gum or other natural gums. The preferred polysaccharides are maltodextrin and high-conversion dextrins. Preferably, the chewing gum bases comprise approximately 5 to about 10% by weight polysaccharides. Among digestible proteins, hydrolyzed collagens or gelatins are preferred; the preferred content is approximately 10 to about 20% by weight in the base.

The gum base can also include fillers and optional minor amounts of ingredients such as colorants, antioxidants, etc.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, and high intensity sweeteners.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sorbitol can be used as a sugarless sweetener. Additionally, sugarless sweeteners can include, but are not limited to, mannitol, xylitol, hydrogenated starch hydrolysates, maltitol, lactitol, and the like, alone or in combination.

High intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweeteners will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose; Raftilose, Raftilin; Fructooligosaccarides (NutraFlora); Palatinose oligosaccharide; Guar Gum Hydrolysate (Sun Fiber); or indegestible dextrin (Fibersol). However, other low calorie bulking agents can be used.

A variety of flavoring agents can be used. The flavor can be used in amounts of approximately 0.1 to about 15 weight percent of the gum and, preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

By way of further example and not limitation, examples of the present invention will now be given:

EXAMPLE 1

Preparing Zein Solution

Zein (Freeman Industries, Inc., Regular grade) was dissolved in a 70 wt % isopropanol (30% water) mixture to form a 10% solution (10 grams zein+90 grams solvents).

EXAMPLE 2

Preparing a Pure Zein Film

A film was cast from 10 grams of the solution described in Example 1 onto a flat-bottom dish with a diameter of 60 mm. It was allowed to dry for 48 hours followed by further drying under vacuum (5 mm Hg) for 8 hours. The film was clear yet brittle.

EXAMPLE 3

Solution Blending

N-cocyl sarcosine (Hampshire, a subsidiary of The Dow Chemical Company) was dissolved in the solution described in Example 1 at a ratio of 1:10 by weight. A film was cast from 10 grams of the solution onto a flat-bottom dish with a diameter of 60 mm. It was allowed to dry for 48 hours followed by further drying under vacuum (5 mm Hg) for 8 hours. The film was clear and soft, suggesting good miscibility. It should theoretically contain 1 part N-cocyl sarcosine for every 1 part zein.

EXAMPLE 4

Solution Blending

N-oleoylsarcosine (Hampshire, a subsidiary of The Dow Chemical Company) was dissolved in the solution described in Example 1 at a ratio of 1:10 by weight. A film was cast from 10 grams of the solution onto a flat-bottom dish with a diameter of 60 mm. It was allowed to dry for 48 hours followed by further drying under vacuum (5 mm Hg) for 8 hours. The film was clear and soft, suggesting good miscibility. It should theoretically contain 1 part of N-oleoyl sarcosine for every 1 part zein.

EXAMPLE 5

Solution Blending

N-lauroyl sarcosine (Hampshire, a subsidiary of The Dow Chemical Company) was dissolved in the solution described in Example 1 at a ratio of 1:10 by weight. A film was cast from 10 grams of the solution onto a flat-bottom dish with a diameter of 60 mm. It was allowed to dry for 48 hours followed by further drying under vacuum (5 mm Hg) for 8 hours. The film was clear and soft, suggesting good miscibility. It should theoretically contain 5 parts N-lauroyl sarcosine for every 5 parts zein.

EXAMPLE 6

Solution Blending

N-myristoyl sarcosine (Hampshire, a subsidiary of The Dow Chemical Company) was dissolved in the solution described in Example 1 at a ratio of 1:20 by weight. A film was cast from 10 grams of such solution onto a flat-bottom dish with a diameter of 60 mm. It was allowed to dry for 48 hours followed by further drying under vacuum (5 mm Hg) for 8 hours. The film was clear and soft, suggesting good miscibility. It should theoretically contain 1 part N-myristoyl sarcosine for every 2 parts Zein.

EXAMPLE 7

Direct Blending

To a Sigma-blade laboratory mixer (Plasti-Corder Digi-System, C.W. Brabender Instruments, Inc., South Hackensack, N.J.), 36 grams of zein were added, and then 15 grams of N-cocyl sarcosine and 15 gram of water were added during agitation. The mixer was set at 50° C. and 32 rpm. After mixing for 20 minutes, the blend was discharged. It was soft, elastic, and translucent, indicating good miscibility.

EXAMPLE 8

Direct Blending

To a Sigma-blade laboratory mixer (Plasti-Corder Digi-System, C.W. Brabender Instruments, Inc., South Hackensack, N.J.), 36 grams of zein were added, and then 15 grams of N-oleoylsarcosine and 15 grams of water were added during agitation. The mixer was set at 50° C. and 32 rpm. After mixing for 20 minutes, the blend was discharged. It was soft, elastic, and translucent, indicating good miscibility.

EXAMPLE 9

Preparing a Chewing Gum

To the Brabender mixer set at 60° C. and 30 rpm, 50 grams of the zein/N-oleoylsarcosine blend prepared in Example 8 were added and agitated for 10 minutes. Then 6 grams of mannitol and 0.5 grams of acesulfame K were added. After 10 more minutes of further mixing, 0.5 ml fruit flavor was added and mixed for another 10 minutes. Then the gum was discharged, rolled to a sheet, and cut into gum cubes. It was soft, pliable, and has a lasting chewing texture similar to a conventional chewing gum. Samples of chewed gum cuds were placed on an outdoor surface and remained undisturbed for two weeks. Thereafter the gum cuds showed obvious signs of degradation such as drying, cracking and disintegration.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of producing a prolamine containing composition comprising the step of:

combining at least one prolamine and at least one N-acyl derivative of amino acid.

2. The method of claim 1, wherein the N-acyl derivative of amino acid is selected based on the molecular weight of the N-acyl derivative of amino acid.

3. The method of claim 1, wherein the N-acyl derivative of amino acid is selected based on the chemical structure of the N-acyl derivative of amino acid.

4. A method of modifying a physical property of a prolamine comprising the step of:

combining at least one prolamine and at least one N-acyl derivative of amino acid.

5. The method of claim 4, wherein the physical property is selected from the group consisting of chemical structure, consistency, elasticity, tack, texture, melting point and combinations thereof.

6. A blend comprising:

at least one prolamine and at least one N-acyl derivative of amino acid.

7. The blend of claim 6, wherein the blend is thermally processable.

8. The blend of claim 6, wherein the prolamine is selected from the group consisting of zein, corn gluten meal, wheat gluten, wheat gliadin, secalinin, avenin, hordein, panicin, orzenin, kafirin and combinations thereof.

9. The blend of claim 6, wherein the N-acyl derivative of amino acid is selected from the group consisting of N-cocoyl sarcosine, N-oleoyl sarcosine, N-lauroyl sarcosine, N-myristoyl, N-stearoyl sarcosine, N-butyroyl sarcosine, N-caproyl sarcosine, N-capryloyl sarcosine, N-palmitoyl sarcosine, N-arachidoyl sarcosine, N-behenoyl sarcosine, N-lignoceroyl sarcosine, N-myristoleoyl sarcosine, N-palmitoleoyl sarcosine, N-erucoyl sarcosine, N-linoleoyl sarcosine, N-linolenoyl sarcosine and combinations thereof.

10. The blend of claim 6, wherein the N-acyl derivative of amino acid is a reaction product of a reaction between at least one amino acid and at least one fatty acid.

11. The blend of claim 10, wherein the amino acid is selected from the group consisting of alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine and combinations thereof.

12. The blend of claim 10, wherein the fatty acid is selected from the group consisting of butyric, caproic, caprylic, capric, lauric, myristic, palmitic, stearic, arachidic, behenic, lignoceric, myristoleic, palmitoleic, oleic, erucic, linoleic, linolenic, arachidonic, eicosapentaenoic, docosahexaenoic and combinations thereof.

13. The blend of claim 6, wherein the prolamine comprises about 5% to about 99.5% by weight of the blend.

14. The blend of claim 6, wherein the N-acyl derivative of amino acid comprises about 0.5% to about 95% by weight of the blend.

* * * * *